United States Patent [19]

Proksa et al.

[11] Patent Number: 4,693,448
[45] Date of Patent: Sep. 15, 1987

[54] CLOSURE UNIT FOR MOLDING TOOLS

[75] Inventors: Ferdinand Proksa, Leverkusen; Hans-Michael Sulzbach, Königswinter; Lothar Röhrig, Hennef; Hans-Wilhelm Fuhrbach, Bonn-Oberkassel, all of Fed. Rep. of Germany

[73] Assignee: Maschinenfabrik Hennecke GmbH, Leverkusen, Fed. Rep. of Germany

[21] Appl. No.: 918,735

[22] Filed: Oct. 14, 1986

[30] Foreign Application Priority Data

Oct. 31, 1985 [DE] Fed. Rep. of Germany ....... 3538683

[51] Int. Cl.$^4$ ..................... B29C 45/67; B29C 33/24
[52] U.S. Cl. .................................. 249/162; 100/214; 425/589; 425/595; 425/406; 425/451.2; 425/451.9
[58] Field of Search .................. 100/212, 237, 269 R, 100/269 A, 269 B, 214, 219; 425/589, 450.1, 451.2, 451.9, 411, 595; 249/161, 162

[56] References Cited

U.S. PATENT DOCUMENTS 3,663,027 5/1972 Klipping .......................... 425/451.9
4,080,889 3/1978 Shiloni ................................ 100/219

Primary Examiner—Willard E. Hoag
Attorney, Agent, or Firm—Gene Harsh; Joseph C. Gil; Aron Preis

[57] ABSTRACT

Closure units for molding tools, in particular those for the production of polyurethane moldings comprising long lifting cylinders arranged between an upper cross head and a movable cross head for lowering and raising the upper half of a molding tool, the movable cross head being mounted on columns connecting the fixed cross head to a base by means of short lifting cylinders having arrestable drag pistons arranged therein, were found to offer advantages in terms of economy of design and operation.

10 Claims, 5 Drawing Figures

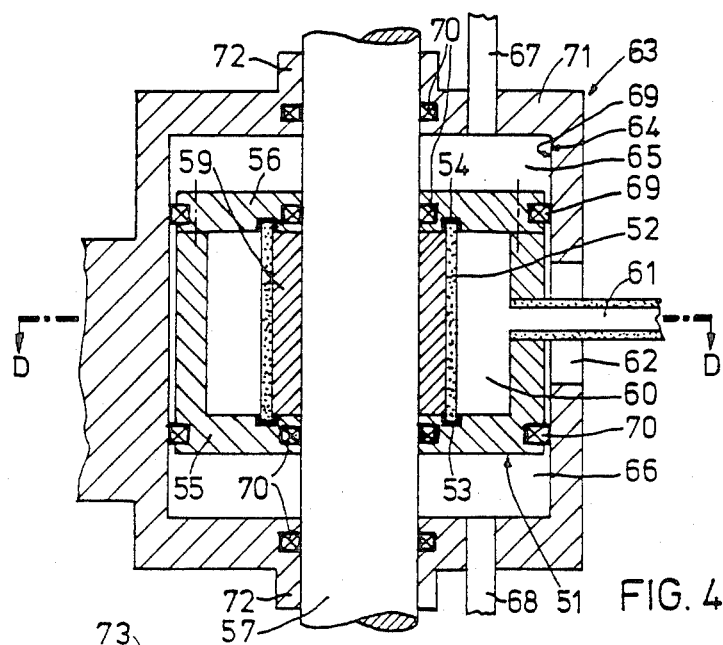
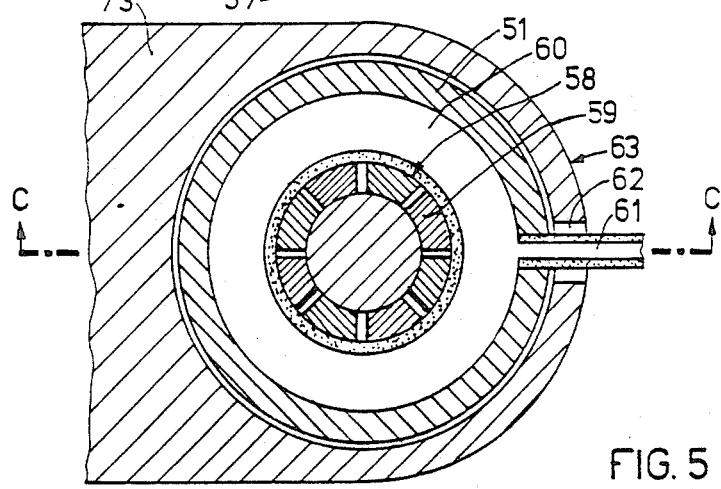

CLOSURE UNIT FOR MOLDING TOOLS

FIELD OF THE INVENTION

The present invention relates to a closure unit for molding tools, more particularly for tools for molding polyurethane.

SUMMARY OF THE INVENTION

The invention relates to a closure unit for molding tools, in particular those for the production of polyurethane moldings comprising a base which is rigidly connected to a cross head by means of at least two columns; a lower clamping plate arranged on the base; and an upper clamping plate arranged on a cross head which is mounted movably on the columns; the clamping plate facing one another and the mounting of the movable cross head being composed of a respective hydraulic cylinder which surrounds a column and in which a piston surrounding the column is arranged.

BACKGROUND OF THE INVENTION

In closure units of this type, the clamping plates or the molding tool halves are driven apart and together and the actual closing force and the opening force is applied with the same hydraulic cylinders. The hydraulic system must therefore inevitably be considerably over-dimensioned so that large quantities of hydraulic fluid have to be conveyed at high pressure in a correspondingly time-consuming manner.

In a different, known closure unit a movable cross head which can be locked on the columns by clamping action is also provided. For raising and lowering this cross head with upper clamping plate and upper molding tool half there are provided between the fixed and the movable cross head some long lifting cylinders whose power merely needs to be adapted to the weight of the contacting parts to be moved. Their size is correspondingly small. Short lifting cylinders are provided between the movable cross head and the upper clamping plate for applying the closing force and for opening the molding tool once the molding has cured, using so-called movable beams. They have the advantage that their hydraulic chambers can be kept relatively small so that they are less complex in terms of design and operate more rapidly owing to the smaller quantities of hydraulic fluid. As closure units are also generally equipped with pivot devices, the additional spatial requirements through these short lifting cylinders is disadvantageous. The required synchronization is not always ensured during the opening process either, so that damage to the molding and, in the long run, also damage to the dividing planes of the molding tool halves can occur due to tilting of the upper half of the molding tool relative to the lower half of the molding tool.

The object is to provide a closure unit of the type mentioned at the outset in which the necessary force systems for the various functions are simple and compact in design and operate rapidly and reliably.

DETAILED DESCRIPTION OF THE INVENTION

This object is achieved in that the piston is composed of a lockable drag piston and the hydraulic cylinder of a short lifting cylinder and in that long lifting cylinders for the processes of lowering and raising the upper clamping plate are arranged between a fixed and a movable cross head.

The new embodiment meets all requirements. The design of the bearing for the cross head as a short lifting cylinder with lockable drag piston enclosed therein guarantees exact synchronization when opening the molding tool due to the exact guidance of the short lifting cylinder on the columns. The spacing required between movable cross head and base is advantageously restricted to the usual size; aad the known use of long lifting cylinders for the raising and lowering of the movable cross head with upper clamping plate and upper halves of the molding tool arranged thereon allows the force systems to be correspondingly small in size because they are separated according to high and low force requirement, so that the entire associated hydraulic system can be correspondingly smaller in size and allows quicker operation. This is especially important, in particular for large closure units, in terms of an economic viability because correspondingly more cycles for the production of moldings can be carried out in the same time owing to the quicker cycle.

The lockable drag piston is preferably designed as a clamping piston.

Other positive arresting means, for example with plug-in pins are also feasible but they are more expensive and the positioning for each locking process would be quite time consuming. Locking can only take place at a predetermined level. On the other hand, clamping pistons have the advantage that the faces of column and clamping piston pointing towards one another are completely smooth over their entire height so that the clamping piston can be locked at any desired level.

The clamping piston preferably contains clamping members which can be pressed against the column. Such clamping members can, for example, be mechanically, hydraulically or pneumatically actuatable clamping pincers. Although a mechanical actuating system is feasible, it is more expensive, so preference is generally given to a hydraulic system.

The clamping members are preferably arranged around the column in the manner of a crown. Such a crown is particularly advantageous because it can be charged with a radial force all the way around.

It is also possible to provide two such crowns concentric one with the other and with a wedging action relative to each other. However, problems can arise when releasing the arresting means.

It is particularly advantageous if the crown of clamping members has the form of a tube which is slotted several times.

This simplifies the assembly and the positioning of the individual fingerlike clamping members is invariably maintained.

It has proven particularly advantageous to seal the crown of clamping members by means of an elastic seal relative to a hydraulically chargeable pressure chamber which surrounds it concentrically.

The seal is preferably composed of an elastic sleeve or of an annular elastic skin which is arranged in the pressure chamber. An elastic sleeve of this type is composed, for example, of a thin, sufficiently flexible tube or metal, rubber or a plastics materials such as polyurethane elastomer. The same applies to the skin.

To allow exact guidance of the short lifting cylinder on the columns, they are provided with sliding guide attachments according to a further particular embodiment. This means that the radial wall portions of the short lifting cylinder facing the columns are widened around the column above the actual wall thickness.

It is also possible, as with injection molding machines, to arrange the columns horizontally and the base as well as the fixed cross head and the movable cross head vertically. This may sometimes be advantageous for reasons of space or reasons of handling.

The invention does not relate to the associated control of the movements for an operating cycle of the closure unit nor to the detailed design of the force systems. Both should be obvious to a person skilled in the art with his practical training and with knowledge of the procedures described below.

The drawing shows a purely schematic embodiment of the new closure unit which is described in more detail below.

FIG. 4 shows a vertical section along line C—C in FIG. 5 through a short lifting cylinder and drag piston according to a further embodiment.

FIG. 5 shows a section along line D—D in FIG. 4.

Figure 1:
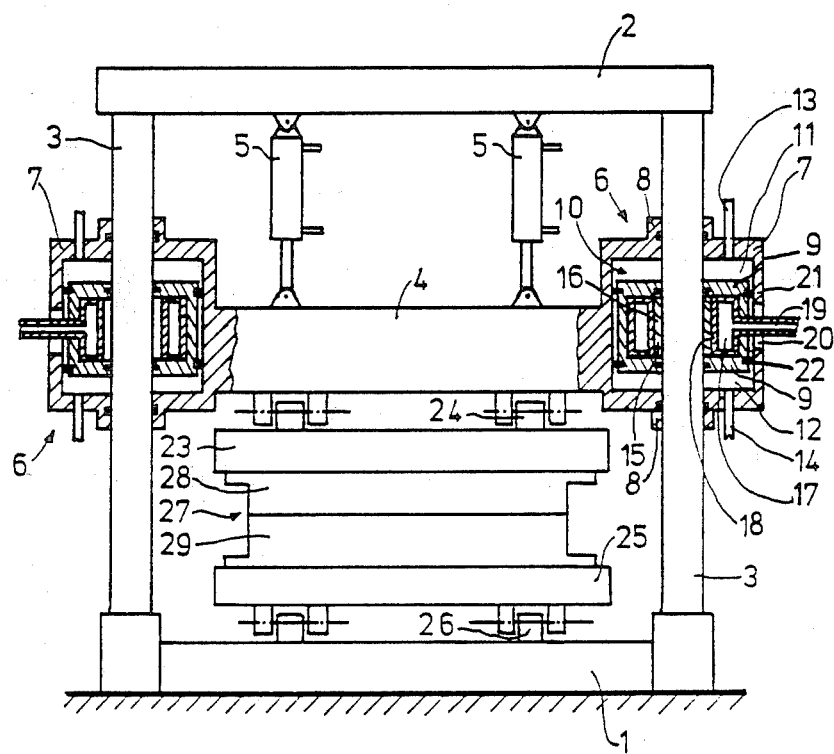
FIG. 1 shows the closure unit in side view and in partial section.
Figure 2:
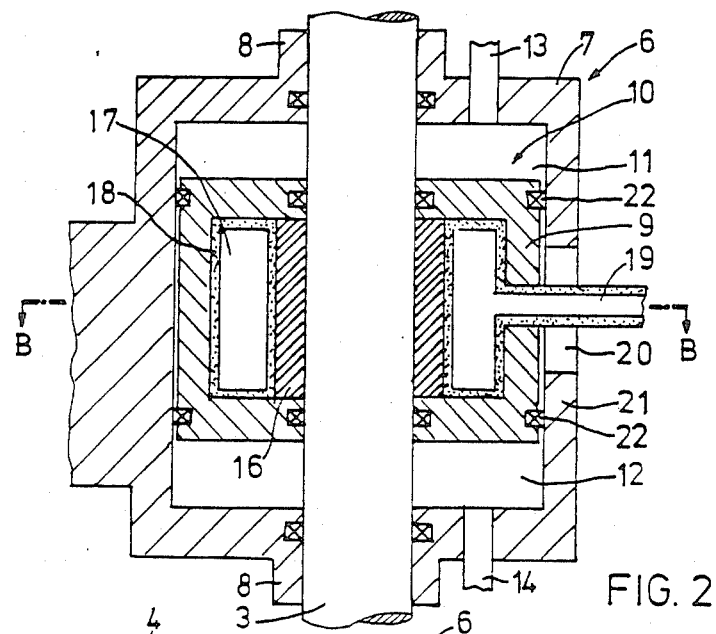
FIG. 2 shows a vertical section along line A—A in FIG. 3 through a short lifting cylinder and drag piston on an enlarged scale.
Figure 3:
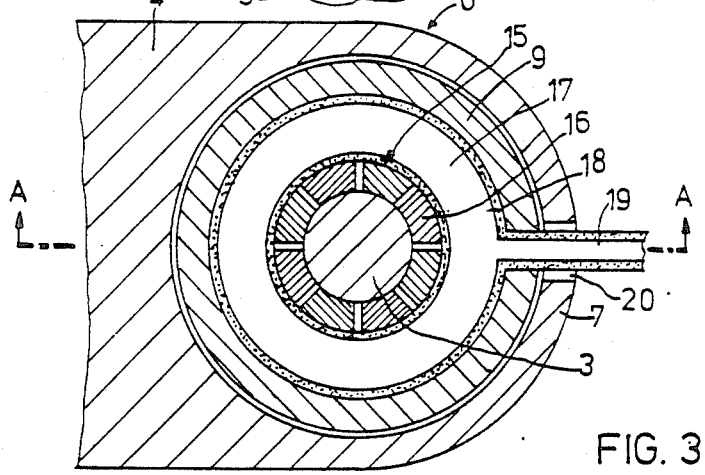
FIG. 3 shows a section along line B—B in FIG. 2.

In FIGS. 1 to 3, the closure unit consists of a base 1 and a cross head 2 between which there extend two columns 3 rigidly connected to it. A further cross head 4 is movably mounted on the columns 3 and is connected via long lifting cylinders 5 to the stationary cross head 2. The mounting 6 of the cross head 4 on the columns 3 consists of a respective short lifting cylinder 7 having sliding guide attachments 8 and encloses an arrestable drag piston 9 designed as a clamping piston. The drag piston 9 divides the cylindrical chamber into two chambers 11, 12 with hydraulic connections 13, 14 which can be hydraulically charged alternately. A crown 15 of clamping members 16 in the form of a tube having several slots is arranged concentrically round the column 2 in each drag and clamping piston 9. The remaining cavity 17 is filled by an annular skin 18 composed of a polyurethane elastomer which is provided with a hydraulic connection nozzle 19. The hydraulic connection nozzle 19 is guided outwardly through a slot 20 in the wall 21 of the short lifting cylinder 7. It goes without saying that the slot 20 is located in a region which is sealed from the chamber 11, 12 by seals 22. An upper clamping plate 23 is connected to the movable cross head 4 by means of pivot bearings 24. A lower clamping plate 25 is connected to the base 1 via pivot bearings 26. Some hydraulic long lifting cylinders (not shown) are provided for the pivoting movement of the clamping plates 23, 25. The associated hydraulic control system is not shown either for the sake of clarity. A molding tool 27 is arranged between the clamping plates 23, 25, the upper half of the molding tool 28 being fixed on the upper clamping plate 23 and the lower half of the molding tool 29 on the lower clamping plate 25.

The structure of the drag piston 51 according to FIGS. 4, 5 corresponds to the structure according to FIGS. 2, 3 with the difference that a seal 52 composed of 0.2 mm thick sheet metal and designed as a tube or sleeve is provided instead of the skin. This tube or sleeve 52 is mounted by its front edges in elastomeric sealing rings 53 of U-shaped cross section which are arranged in corresponding grooves 54 in the radial wall portions 55 of the drag piston 51. For better assembly, the drag piston 51 is pot-shaped in design with a screw-on cover 56. A crown 58 of clamping members 59 is provided between tube or sleeve 52 and column 57. The cavity 60 remaining in the drag or clamping piston 51 is provided with a hydraulic connection nozzle 61 which is guided outwards through a slot 62 in the short lifting cylinders 63. The cavity 64 of the short lifting cylinder 62 is also divided in this case by the drag piston 51 into two hydraulic chambers 65, 66 having hydraulic connecting nozzles 67, 68. The drag piston 51 is sealed from the internal wall 69 of the short lifting cylinder 62 and from the column 57 by seals 70. The radial wall portions 71 of the short lifting cylinder 63 are provided with sliding guide attachments 72 and also have seals 70 acting against the column in this region.

DESCRIPTION OF THE OPERATION

The closure unit according to FIGS. 1 to 3 is described in its use in producing a polyurethane foam article.

The closure unit firstly assumes the open state for the molding tool 27. This means that the long lifting cylinders 5 have drawn the movable cross head 4 into the upper position so that the mold cavity is open. The operator now undertakes the preparation work required for producing the molding. The long lifting cylinders 5 are then charged in such a way that the cross head 4 with the clamping plate 23 fixed thereon and the upper half of the mold 28 is lowered until it rests on the lower half of the molding tool 27. The drag pistons 9 are not arrested during this process. During the lowering process they are entertained by the short lifting cylinders 7 and rest on the upper radial wall portions thereof. The drag pistons 9 are driven downwards somewhat by charging the chambers 11 with hydraulic fluid and this can be carried out alternatively during the lowering process by means of long lifting cylinders.

The crowns 15 composed of clamping member 16 are then pressed against columns 3 by charging the skins 18 with pressure and are thus arrested. The pressure chambers 12 are now charged so that the cross head presses the two halves of the molding tool 28, 29 together with the predetermined closing force via the clamping plate 23. A polyurethane reaction mixture is then produced in a mixing device (not shown) of which the mixer head (not shown) is mounted on the molding tool 27 and is poured into the mold cavity. Once the molding has cured, the pressure chambers 11 are hydraulically charged so that the molding tool is opened by means of the associated raising of the movable cross head 4. The drag piston 9 is then unlocked and the long lifting cylinders 5 simultaneously charged with pressure so that the cross head 4 travels upwards with clamping plates 23 and upper half of the molding tool 28. During this process, the drag pistons 9 are dragged upwards with the short lifting cylinders 7. For easier removal of the molding the molding tool halves 28, 29 are tilted about the pivot pins 24, 26. After cleaning the molding tool cavity, the molding tool halves 28, 29 are pivoted back and a new cycle can begin.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A molding press having a closure unit comprising: a base which is rigidly connected via at least two columns to a fixed cross head, a lower mold clamping plate arranged on the base, an upper mold clamping plate arranged on a movable cross head which is attached by a mounting to each of said columns, the clamping plates facing one another, and actuating means including a hydraulic cylinder which surrounds said column in which a piston surrounding the column is arranged, said piston being an arrestable drag piston and the hydraulic cylinder being a short lift cylinder, said upper clamping plate being movable by means of at least two long lift cylinders arranged between said fixed cross head and said movable cross head.

2. The press of claim 1 wherein the short lifting cylinder has sliding guide attachments.

3. The press of claim 1 wherein the columns are arrabged horizontally and the base, fixed cross head and movable cross head are arranged vertically.

4. The press of claim 1 wherein the arrestable drag piston is a clamping piston.

5. The press of claim 4, wherein the clamping piston contains clamping members pressable against the column.

6. The press of claim 5, wherein the clamping members are arranged around the column in the form of a crown.

7. The press of claim 6, wherein the crown is in the form of a tube having a plurality of slots.

8. The press of claim 6, wherein the crown is sealed by means of an elastic seal relative to a hydraulically chargeable pressure chamber which surrounds it concentrically.

9. The press of claim 8, wherein the seal is an elastic sleeve.

10. The press claim 8, wherein the seal is an annular elastic hollow skin which is arranged in said pressure chamber.

* * * * *